United States Patent
Zielinski et al.

(10) Patent No.: US 9,784,120 B2
(45) Date of Patent: Oct. 10, 2017

(54) TURBOMACHINE STAGE AND METHOD FOR DETECTING A SEALING GAP OF SUCH A TURBOMACHINE STAGE

(71) Applicant: MTU Aero Engines AG, Munich (DE)

(72) Inventors: Michael Zielinski, Unterschleissheim (DE); Andreas Zeisberger, Munich (DE); Rene Schneider, Ottobrunn (DE)

(73) Assignee: MTU Aero Engines AG, Munich (DE)

( * ) Notice: Subject to any disclaimer, the term of this patent is extended or adjusted under 35 U.S.C. 154(b) by 709 days.

(21) Appl. No.: 14/284,171

(22) Filed: May 21, 2014

(65) Prior Publication Data

US 2014/0348632 A1   Nov. 27, 2014

(30) Foreign Application Priority Data

May 22, 2013  (EP) .................................... 13168663

(51) Int. Cl.
*F01D 21/00* (2006.01)
*F01D 11/12* (2006.01)
(Continued)

(52) U.S. Cl.
CPC ............ *F01D 21/003* (2013.01); *F01D 11/08* (2013.01); *F01D 11/12* (2013.01); *F01D 17/02* (2013.01); *G01B 7/14* (2013.01); *F05D 2250/182* (2013.01); *F05D 2260/80* (2013.01); *F05D 2270/821* (2013.01)

(58) Field of Classification Search
CPC . F01D 5/141; F01D 5/20; F01D 17/06; F01D 21/003; F02K 3/06; G01D 5/2457; G01D 5/2417; G01P 3/48
See application file for complete search history.

(56) References Cited

U.S. PATENT DOCUMENTS 4,144,421 A * 3/1979 Sakai ...................... F01D 21/04
                                              200/61.4
4,876,505 A * 10/1989 Osborne .................. G01B 7/14
                                              324/207.25
(Continued)

FOREIGN PATENT DOCUMENTS

GB         2 204 693 A     11/1988
WO    WO 2008/031394 A2     3/2008

OTHER PUBLICATIONS

European Search Report dated Nov. 6, 2013, with Statement of Relevancy (Six (6) pages).
(Continued)

*Primary Examiner* — Mark Laurenzi
*Assistant Examiner* — Shafiq Mian
(74) *Attorney, Agent, or Firm* — Crowell & Moring LLP

(57) ABSTRACT

A turbomachine stage, in particular a turbine stage or compressor stage of a gas turbine, is disclosed. The turbomachine stage has a, in particular conical, housing in which a rotor blade arrangement having a plurality of rotor blades is disposed which have an outer shroud having at least one radial sealing flange. The sealing flange has a recess arrangement having at least one radial recess in which a radial projection is disposed, in particular centrally. A sensor arrangement having at least one capacitive sensor for detecting a radial distance from a circumferential surface of the sealing flange is disposed on the housing.

8 Claims, 1 Drawing Sheet

(51) Int. Cl.
*F01D 17/02* (2006.01)
*G01B 7/14* (2006.01)
*F01D 11/08* (2006.01)

(56) References Cited

U.S. PATENT DOCUMENTS

| | | | | |
|---|---|---|---|---|
| 5,411,364 | A * | 5/1995 | Aberg | F01D 17/02 250/227.15 |
| 5,818,242 | A * | 10/1998 | Grzybowski | F01D 11/025 324/642 |
| 7,215,129 | B1 * | 5/2007 | Andarawis | F01D 21/003 324/661 |
| 7,333,913 | B2 * | 2/2008 | Andarawis | G01B 7/144 702/158 |
| 7,455,495 | B2 * | 11/2008 | Leogrande | F01D 11/24 415/1 |
| 7,722,310 | B2 * | 5/2010 | Balasubramaniam | G01B 7/14 324/545 |
| 7,891,938 | B2 * | 2/2011 | Herron | G01B 7/14 415/1 |
| 8,137,058 | B2 * | 3/2012 | Simpson | F01D 11/14 415/118 |
| 9,417,048 | B2 * | 8/2016 | Esler | G01B 7/14 |
| 2005/0088171 | A1 * | 4/2005 | Gualtieri | G01B 7/14 324/207.26 |
| 2005/0286995 | A1 * | 12/2005 | Shang | F01D 11/06 415/1 |
| 2009/0003991 | A1 * | 1/2009 | Andarawis | F01D 9/00 415/118 |
| 2009/0290971 | A1 * | 11/2009 | Shamseldin | F04D 29/124 415/1 |

OTHER PUBLICATIONS

U.S. Patent Application, "Turbomachine Stage and Method for Determining a Seal Gap and/or an Axial Position of Such a Turbomachine Stage", filed May 21, 2014, Inventor Florian Gerbl, et al.

* cited by examiner

TURBOMACHINE STAGE AND METHOD FOR DETECTING A SEALING GAP OF SUCH A TURBOMACHINE STAGE

This application claims the priority of European Patent Document No. EP 13168663.6, filed May 22, 2013, the disclosure of which is expressly incorporated by reference herein.

BACKGROUND AND SUMMARY OF THE INVENTION

The present invention relates to a turbomachine stage, in particular a turbine or compressor stage of a gas turbine, having a, in particular conical, housing, in which a rotor blade arrangement having a plurality of rotor blades is disposed, which comprises an outer shroud having at least one radial sealing flange, and a method for detecting a sealing gap of such a turbomachine stage.

The sealing gap between the housing and the outer shroud can be reduced by one or more radial sealing flanges disposed successively in the axial direction. In the process, in particular because of different operating conditions, it is possible for rubbing to occur between the sealing flange and the housing, and subsequently for an abrasion to occur on the sealing flange and/or a worn area in the housing thereby altering the sealing gap. Knowledge of the actual sealing gap can be advantageous, in particular for adjusting the operation of the turbomachine thereto and/or for carrying out or planning maintenance.

One object of an embodiment of the present invention is to improve the maintenance and/or the operation of a turbomachine stage.

A turbomachine stage according to one aspect of the present invention can be in particular a turbine or compressor stage of a gas turbine, preferably of an aircraft engine.

It comprises a rotor blade arrangement having a plurality of adjacent rotor blades in the circumferential direction, which can be configured to be detachable or fixed, in particular integral, with a rotor of the turbomachine. The rotor blade arrangement is disposed in a housing, which, in one embodiment, can converge or diverge in the direction of flow, at least in the region of the rotor blade arrangement, and which for a more compact representation is designated here in general as a conical housing. Similarly, the housing can have, at least in the region of the rotor blade arrangement, an at least substantially constant cross section in the direction of flow, which is designated here accordingly as a cylindrical housing.

The rotor blade arrangement comprises an outer shroud, which can be formed of a plurality of outer shroud sections, each of which can be connected to one or more rotor blades. In one embodiment, the outer shroud can converge or diverge in the direction of flow or can comprise an at least substantially constant outer circumference, which is designated here accordingly as a conical or cylindrical outer shroud.

Disposed radially outside on the outer shroud are one or a plurality of radial sealing flanges spaced apart from each other in the axial or flow direction, which preferably extend rib-like radially outwardly and in the circumferential direction. Such radial sealing flanges are also designated as sealing fin(s) for short in the following.

According to one aspect of the present invention, the single sealing flange, in the case of a plurality of sealing flanges spaced apart from each other in the axial direction of one or a plurality of, in particular all, sealing flanges respectively comprises a recess arrangement having one or a plurality of radial recesses. A plurality of radial recesses can be distributed equidistantly or asymmetrically over the circumference. In one embodiment, the recess arrangement comprises precisely two, three or four recesses. In one embodiment, a recess can comprise two opposing flanks, which, in a further development, extend, at least substantially, in the radial direction and/or merge into an adjacent, preferably cylinder ring-shaped, outer circumference of the sealing flange, preferably into a rounding. Extending between the flanges in a further development is a recess base, which in one embodiment can have, at least substantially, a cylinder ring-shaped circumferential surface. Consequently, in one embodiment a recess can be configured to be U-shaped in particular.

A radial projection is disposed in the recess. It can extend radially outwardly in particular from the recess base and in a further development can comprise, at least substantially, a cylinder ring-shaped circumferential surface. The radial projection can be disposed, as viewed in the circumferential direction, in particular centrically in the recess, but similarly also eccentrically. In one embodiment, the recess with the projection disposed therein is configured symmetrically, which in the case of rotations in the opposite direction can produce advantageously homogenous signals. Similarly, the recess with the projection disposed therein can also be configured asymmetrically in order to produce advantageously different signals in the case of rotations in the opposite direction.

Disposed on the housing is a sensor arrangement having one or a plurality of capacitive sensors or probes for detecting a radial distance from a circumferential surface of the sealing flange. A plurality of sensors can be distributed equidistantly or asymmetrically over the circumference. In one embodiment, the sensor arrangement comprises precisely two, four or six sensors. A capacitive sensor for detecting a radial distance from a circumferential surface of the sealing flange is understood here in particular as a means that supplies a signal, which is a function of a radial distance of the sensor from the circumferential surface, preferably non-linear. Designated as a circumferential surface here is in particular a surface of a sealing flange, of a recess or of a projection, which extends in the circumferential and axial direction, i.e., the upper side of the sealing flange, of the recess or of the projection as viewed from the radial outside.

When a recess travels over a sensor the radial distance changes: it increases to begin with as soon as the sensor detects the recess base. Then the radial distance decreases when the sensor detects the projection. Then it increases again as soon as the sensor detects the recess base on the opposite side of the projection in the circumferential direction. Then the radial distance decreases again to the initial value when the sensor detects the circumferential surface of the sealing flange next to the recess. Therefore, in one embodiment, when a recess rotates past a sensor, a generally W-like signal progression with four alternating, opposite-direction signal swings is produced. A signal swing is designated here in particular as a, substantially step-shaped, increase or decrease of the signal or signal value of the sensor.

According to one aspect of the present invention, at least one signal swing of the sensor arrangement is detected as a result of a detection of at least one recess of the recess arrangement and of the projection in the recess by means of at least one sensor of the sensor arrangement. The subsequent detection or analysis explained based on a recess and one or two sensors can be carried out in the same manner for a plurality of recesses and/or sensors, wherein then, in one embodiment, the detection results can be compared with one another, in particular can be averaged.

In one embodiment, the signal swing, which is yielded as a result of the change in distance between the recess base and the projection and/or between the projection and the recess base, is allocated to a radial distance of the rotor blade arrangement based on a previous calibration: in the case of a capacitive sensor, the capacity of a capacitor detected directly or indirectly changes as a result of the change in the effective circumferential surface of the recess base or the projection. The change or signal swing is different in the case of different radial distances of the sealing flange from the sensor or the housing, on which it is disposed. Correspondingly, the signal swing can be allocated to a specific radial distance, wherein in a previous calibration, specific signal swings were allocated accordingly to specific radial distances. The allocation of a detected signal swing to a radial distance based on a previous calibration can be carried out in particular by, preferably linear, interpolation or extrapolation between value pairs of the calibration.

In one embodiment, the sensor arrangement has at least two sensors, the detection surfaces of which enclose, with an axis of rotation of the turbomachine stage, different angles, in particular in opposite directions, preferably at least substantially of equal amounts. In terms of amount, the angles are preferably greater than 5°, in particular greater than 10°. In addition or as an alternative, in one embodiment they are less than 25°, in particular less than 20° in terms of amount. In one embodiment, the angles are, at least substantially, equal to ±15°.

A sensor comprises a detection area in the circumferential direction. The successive detection areas in the axial direction together form one detection area within the meaning of the present invention. A sensor comprises in particular a detection area, which encloses an angle with the axis of rotation, when the sensor detects displaced recesses or projections in the axial direction correspondingly earlier or later. The greater the amount of the angle, the earlier or later the sensor detects two displaced or aligned recesses in the axial direction. For example, if a sensor comprises a rectangular sensor surface facing the sealing flange, the main axis of which encloses an angle with the axis of rotation of the turbomachine stage, then the detection area also correspondingly encloses this angle with the axis of rotation.

Because of these detection surfaces that are inclined with respect to the axis of rotation of the turbomachine, it is possible in one embodiment for an axial position of the rotor blade arrangement to be detected. To this end, in one embodiment, first a signal swing of the sensor arrangement is detected as a result of a detection of a recess of the recess arrangement and of the projection in the recess by means of a sensor of the sensor arrangement. By further rotating the rotor towards a further sensor, a further signal swing of the sensor arrangement is detected as a result of a detection of this recess and of the projection in this recess by means of a further sensor of the sensor arrangement. The distance of these signal swings, in particular the time-related distance or rotation angle distance, can then be allocated based on a previous calibration to an axial position of the rotor blade arrangement. If the detection surfaces of two sensors converge in the axial direction, then the distance of the signal swings decreases the farther the sealing flange is displaced in the axial direction. Conversely, the distance increases in the case of detection surfaces diverging in the axial direction or a displacement against the axial direction.

Just as explained in the foregoing relating to the signal between the recess base and the projection or the projection and the recess base, a signal swing is also produced when a recess enters or exits the detection surface of a sensor. In one embodiment of the present invention, the sensor is used to detect an abrasion of the sealing flange: the greater the abrasion, the smaller the signal swing. Accordingly, in one embodiment, at least one signal swing of the sensor arrangement can be detected as a result of a detection of a recess of the recess arrangement and of a circumferential surface of the sealing flange adjacent to the recess, in particular upstream or downstream in the rotational direction, by means of a sensor of the sensor arrangement and the signal swing can be allocated to an abrasion of the sealing flange based on a previous calibration.

The sealing gap between the sealing flange and the housing, in particular an abradable lining of the housing, can, along with the radial distance of the sealing flange from a housing-mounted sensor and a possible abrasion of the sealing flange, also be a function of a worn area on the housing and/or the axial position of the sealing flange. Accordingly, in one embodiment of the present invention, a worn area of the housing opposite from the sealing flange, in particular of an abradable lining of the housing opposite from the sealing flange, can be detected, in particular periodically. This can be taken into account in the detection of the sealing gap, in particular added to a detected radial distance and/or to an abrasion of the sealing flange.

As explained in the foregoing, the signal swings or the distances thereof can be allocated to radial distances or axial positions through a, preferably two-dimensional, calibration. Correspondingly, in one embodiment of the present invention, to begin with, an axial position of a sealing flange is determined from the distances between the signal swings, which successively detect the same recess by means of sensors having detection surfaces inclined in opposite directions, and subsequently from the signal swings between the recess base and the projection or the adjacent, non-recessed circumferential surface of the sealing flange based on the two-dimensional calibration of the radial distance or abrasion of the sealing flange. In a further development, an actual sealing gap can be determined from this along with the likewise detected worn area.

In one embodiment of the present invention, a circumferential surface of the radial projection is lowered radially in the recess. Through this, an abrasion of the remaining circumferential surface of the sealing flange surrounding the recess also does not change the signal swing between the recess base and the projection.

A recess can be disposed completely in an outer shroud section. Similarly, a recess, in particular the projection, can be configured in common by two adjacent outer shroud sections or the recess, in particular the projection, can extend over the contact surface of two adjacent rotor blades. In the process, the recess, in particular the projection can be symmetrically distributed to two adjacent outer shroud sections or extend symmetrically to the contact surface.

In one embodiment, the sealing flange of one or two adjacent outer shroud sections is lowered radially with respect to the sealing flange of the further outer shroud sections following it or them so that the recess extends over one or both complete outer shroud sections. In this way, it is especially simple to constitute a recess with a radial projection. The radial projection can be disposed on the facing contact surfaces of these adjacent outer shroud sections.

In one embodiment, the turbomachine stage comprises a processing means, which is equipped to carry out the method described here. A means within the meaning of the present invention can be configured in terms of hardware and/or software, in particular a digital processing unit, in particular a microprocessor unit (CPU), preferably connected in terms of data or signals to a storage system and/or bus system, and/or one or a plurality of programs or program modules. The CPU can be configured to execute commands, which are implemented as a program stored in a storage system, detect input signals from a data bus and/or emit output signals to a data bus. A storage system can comprise one or a plurality of, in particular different, storage media, in particular optical, magnetic, solid-state and/or other non-volatile media. The program can be constructed in such a way that it is able to embody or execute the method described here so that the CPU can execute the steps of such a method and thus detect a sealing gap in particular.

Additional advantageous further developments of the present invention are disclosed in the following description of preferred embodiments. The drawings are partially schematized.

DETAILED DESCRIPTION OF THE DRAWINGS

Figure 1:
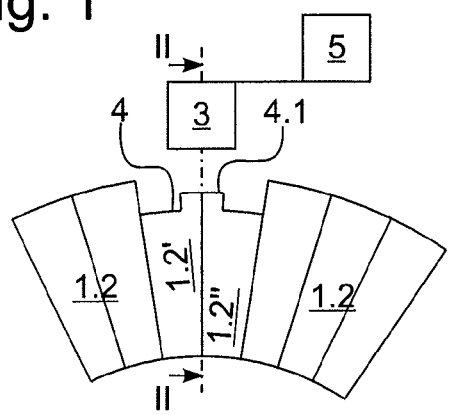
FIG. 1 is a view in the axial direction of a portion of a turbomachine stage according to an embodiment of the present invention.
Figure 2:
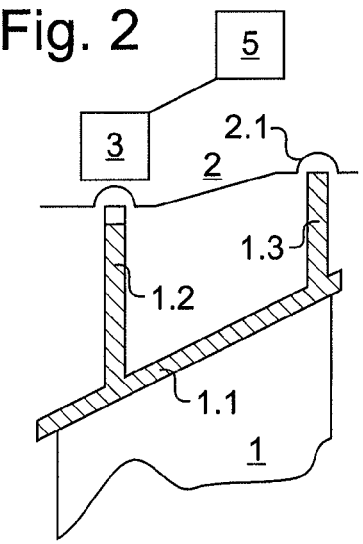
FIG. 2 is a portion of the turbomachine stage from FIG. 1 along intersection line II-II in FIG. 1.
Figure 4:
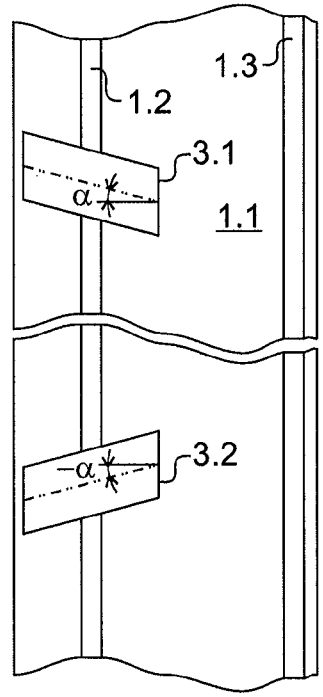
FIG. 4 is a top view in the radial direction from outside of a portion of a developed view of the turbomachine stage from FIG. 1.

FIGS. 1, 2 and 4 show, in a view in the axial direction (FIG. 1), a meridian plane (FIG. 2), or a developed top view in the radial direction of a portion of a turbomachine stage according to an embodiment of the present invention. The turbomachine stage can be, for example, a turbine or compressor stage of a gas turbine, preferably of an aircraft engine.

It comprises a rotor blade arrangement having a plurality of rotor blades 1 that are adjacent in the circumferential direction. The rotor blade arrangement is disposed in a conical housing 2.

The rotor blade arrangement comprises a conical outer shroud 1.1 formed of a plurality of outer shroud sections, each of which can be connected to one or more rotor blades.

Disposed radially outside on the outer shroud are two radial sealing flanges 1.2, 1.3 spaced apart from each other in the axial or flow direction (horizontally from left to right in FIGS. 2 and 4), which extend rib-like radially outwardly (see FIGS. 1 and 2) and in the circumferential direction (see FIGS. 1 and 4).

The present invention will be explained in greater detail in the following making reference to the left sealing flange 1.2 in FIGS. 2 and 4; the statements can apply equally to the right sealing flange 1.3 in FIGS. 2 and 4.

The sealing flange 1.2 is formed by a plurality of sealing flange sections, which are configured integrally with the respective outer shroud section, two of which are designated as 1.2' or 1.2" in FIG. 1 for better differentiation.

The sealing flange 1.2 comprises a recess arrangement having four radial recesses 4, one of which is depicted in FIG. 1. Each of the similar recesses comprises two opposing flanks (left and right in FIG. 1), which extend substantially in the radial direction. Extending between the flanks is a recess base, which comprises a cylinder ring-shaped circumferential surface, so that the recess 4 is configured to be U-shaped.

Disposed in the recess 4 is a radial projection 4.1, which extends radially outwardly from the recess base and comprises a cylinder ring-shaped circumferential surface. The radial projection 4.1 is disposed, as viewed in the circumferential direction, centrically in the recess 4. The recess 4 with the projection 4.1 disposed therein is configured symmetrically.

Disposed on the housing 2 is a sensor arrangement 3 having six capacitive sensors for detecting a radial distance from a circumferential surface of the sealing flange; FIGS. 1 and 2 depict one sensor and FIG. 4 depicts two sensors 3.1, 3.2.

When a recess 4 travels over a sensor the radial distance changes: it increases to begin with as soon as the sensor detects the recess base. Then the radial distance decreases when the sensor detects the projection. Then it increases again as soon as the sensor detects the recess base on the opposite side of the projection in the circumferential direction. Then the radial distance decreases again to the initial value when the sensor detects the circumferential surface of the sealing flange next to the recess.

Figure 3A:
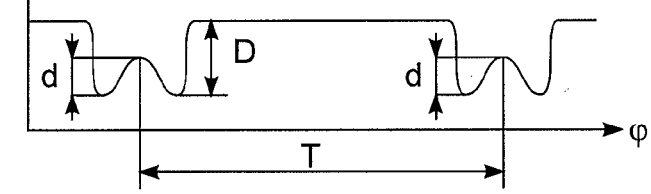
FIG. 3A is a signal of a sensor of the turbomachine stage of FIG. 1 for an axial position and a radial distance of the rotor blade arrangement of the turbomachine stage.

Therefore, when a recess rotates past a sensor, a generally W-like signal progression with four alternating, opposite-direction signal swings is produced. FIG. 3A depicts such a signal progression for the two adjacent sensors 3.1, 3.2 when the same recess 4 successively rotates past the sensors 3.1, 3.2. In the process, the abscissa φ can depict an angle of rotation of the rotor wheel arrangement or the time in equal measure, because both are mutually transferable via the rotational speed of the rotor wheel arrangement.

A processing means 5 is used to detect the signal swings of the sensor arrangement as a result of a detection of the recesses of the recess arrangement and the projections thereof by means of the sensors of the sensor arrangement.

Figure 3B:
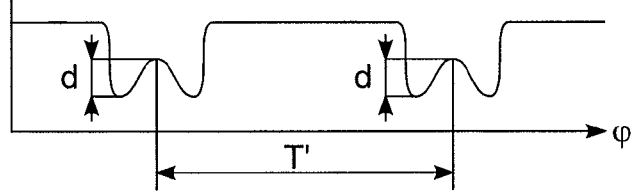
FIG. 3B is a signal of the sensor in FIG. 3A of a corresponding representation for another axial position.
Figure 3C:
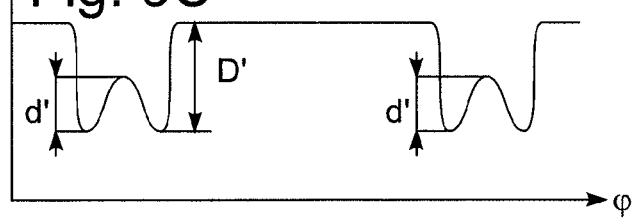
FIG. 3C is a signal of the sensor in FIG. 3A of a corresponding representation for another radial distance.

The signal swings d, which are yielded as a result of the distance change between the recess base and the projection and between the projection and the recess base, are allocated to a radial distance of the rotor blade arrangement based on a previous calibration. FIG. 3C depicts the signal progression of FIG. 3A for another radial distance between the rotor blade arrangement 1 and the sensor arrangement 3 or housing 2. One can see that the signal swings d' differ in the case of these different radial distances. Correspondingly, the signal swing d or d' can be respectively allocated to a specific radial distance based on a previous calibration radial distance.

The sensors of the sensor arrangement and the detection surfaces thereof form, with an axis of rotation of the turbomachine stage, angles ±α of equal amounts of ± 15° in opposite directions (see FIG. 4).

Because of these detection surfaces that are slanted with respect to the axis of rotation of the turbomachine, it is possible to detect an axial position of the rotor blade arrangement. FIG. 3B depicts the signal progression of FIG. 3A for another axial position of the rotor blade arrangement 1. First the signal swings d of the sensor arrangement are detected as a result of a detection of a recess of the recess arrangement and of the projection in this recess by means of a sensor 3.1 of the sensor arrangement (on the left in FIGS. 3A and 3B).

By further rotating the rotor towards a further sensor 3.2, further signal swings (on the right in FIGS. 3A and 3B) of the sensor arrangement are detected as a result of a detection of this recess and of the projection in this recess by means of a further sensor 3.2 of the sensor arrangement. The time-related distance or rotation angle distance of these signal swings, indicated in FIGS. 3A and 3B by the distance T or T' of the middle peaks, can then be allocated in the processing means 5 based on a previous calibration to an axial position of the rotor blade arrangement.

FIG. 4 shows that, in the case of the detection surfaces of the sensors 3.1, 3.2 that are converging from left to right, the distance of the signal swings decreases the farther the sealing flange is displaced from left to right.

Just as explained in the foregoing relating to the signal between the recess base 4 and the projection 4.1 or the projection 4.1 and the recess base 4, a signal swing D or D' (see FIGS. 3A and 3C) is also produced when a recess enters or exits the detection surface of a sensor. The sensor is used in the processing means 5 to detect an abrasion of the sealing flange 1.2: the greater the abrasion, the smaller the signal swing D or D'. Accordingly, signal swings of the sensor arrangement can be detected as a result of a detection of a recess of the recess arrangement and of a circumferential surface of the sealing flange adjacent to the recess, in particular upstream or downstream in the rotational direction, by means of a sensor of the sensor arrangement and the signal swings can be allocated to an abrasion of the sealing flange based on a previous calibration.

The sealing gap between the sealing flange and the housing, in particular an abradable lining of the housing, can, along with the radial distance of the sealing flange from a housing-mounted sensor and a possible abrasion of the sealing flange, also be a function of a worn area 2.1 on the housing, as indicated in FIG. 2. Accordingly, a worn area of the housing 2 opposite from the sealing flange, in particular of an abradable lining of the housing opposite from the sealing flange, can be detected and be taken into consideration by the processing means 5 in the detection of the sealing gap, in particular for a detected radial distance, and be added to an abrasion of the sealing flange.

FIG. 1 shows that the circumferential surface of the radial projection 4.1 is lowered radially in the recess 4 and that the recess 4 and the projection 4.1 extend symmetrically over the contact surface of two adjacent rotor blades. For this, the sealing flanges 1.2', 1.2" of two adjacent outer shroud sections are lowered radially with respect to the sealing flange 1.2 of the further outer shroud sections following it (see FIG. 1), so that the recess 4 extends over both complete outer shroud sections 1.2', 1.2". The radial projection 4.1 is disposed on the facing contact surfaces of the adjacent outer shroud sections 1.2', 1.2".

Although exemplary embodiments were explained in the previous description, it should be noted that a plurality of modifications are possible. It should also be noted that the exemplary embodiments are merely examples, which should not restrict the protective scope, the applications and construction in any manner. On the contrary, the foregoing description provides a person skilled in the art with a guideline for implementing at least one exemplary embodiment, wherein various modifications, in particular with respect to the function and arrangement of the described components, can be undertaken without leaving the protective scope, as yielded by the claims and these equivalent combination of features.

LIST OF REFERENCE CHARACTERS:

1 Rotor blade (arrangement)
1.1 Outer shroud (section)
1.2, 1.3 Sealing flange
1.2', 1.2" Sealing flange section
2 Housing
2.1 Worn area
3 Sensor arrangement
3.1, 3.2 (Detection surface of a) sensor
4 Recess
4.1 Radial projection
5 Processing means As also discussed above, the foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A turbomachine stage, comprising:
   a housing;
   a rotor blade arrangement disposed within the housing, wherein the rotor blade arrangement has an exterior shroud band section with a sealing flange; and
   a sensor arrangement including a first sensor arranged on the housing, wherein a radial clearance to a circumferential surface of the sealing flange is detectable by the first sensor;
   wherein the sealing flange has a recess arrangement with a radial recess and a radial projection;
   wherein the sensor arrangement further includes a second sensor;
   wherein respective sensing surfaces of the first sensor and the second sensor form equally sized angles in opposite directions with an axis of rotation of the turbomachine stage.

2. The turbomachine stage according to claim 1, wherein the turbomachine stage is a turbine stage or compressor stage of a gas turbine.

3. The turbomachine stage according to claim 1, wherein a circumferential surface of the radial projection is radially depressed in the radial recess.

4. The turbomachine stage according to claim 1, further comprising a processor coupled to the sensor arrangement.

5. A method for determining a seal gap between sealing flange of a rotor blade arrangement and a housing in a turbomachine stage, wherein the sealing flange has a recess arrangement with a radial recess and a radial projection and a sensor arrangement with a first sensor; and a second sensor is arranged on the housing, the method comprising the steps of:
   detecting a first signal swing of the sensor arrangement as a result of the radial recess and the radial projection of the recess arrangement being detected by the first sensor of the sensor arrangement; and
   detecting a second signal swing of the sensor arrangement as a result of the radial recess and the radial projection being detected by the second sensor of the sensor arrangement;

wherein respective sensing surfaces of the first sensor and the second sensor form equally sized angles in opposite directions with an axis of rotation of the turbomachine stage.

6. The method according to claim 5, further comprising the step of allocating the first signal swing and the second signal swing to a radial distance of the rotor blade arrangement based on a prior calibration.

7. The method according to claim 6, further comprising the step of
allocating the first signal swing and the second signal swing to an axial position of the rotor blade arrangement based on a prior calibration.

8. The method according to claim 6, further comprising the step of detecting a rubbing on the housing opposite from the sealing flange.

\* \* \* \* \*